(12) United States Patent
Suzuki

(10) Patent No.: US 11,654,775 B2
(45) Date of Patent: May 23, 2023

(54) MOTOR DRIVE DEVICE

(71) Applicant: DENSO CORPORATION, Kariya (JP)

(72) Inventor: Ryo Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 296 days.

(21) Appl. No.: 17/094,062

(22) Filed: Nov. 10, 2020

(65) Prior Publication Data

US 2021/0146784 A1    May 20, 2021

(30) Foreign Application Priority Data

Nov. 20, 2019    (JP) .............................. JP2019-209776

(51) Int. Cl.
| | |
|---|---|
| *H02P 1/46* | (2006.01) |
| *B60L 15/08* | (2006.01) |
| *B60L 3/00* | (2019.01) |
| *B60L 15/20* | (2006.01) |
| *H02P 6/08* | (2016.01) |
| *H02K 7/00* | (2006.01) |

(52) U.S. Cl.
CPC ............. *B60L 15/08* (2013.01); *B60L 3/0084* (2013.01); *B60L 15/20* (2013.01); *H02K 7/006* (2013.01); *H02P 6/08* (2013.01); *B60L 2220/16* (2013.01); *B60L 2240/12* (2013.01); *B60L 2240/421* (2013.01); *B60L 2240/423* (2013.01); *B60L 2240/427* (2013.01); *B60L 2240/429* (2013.01); *Y02T 10/64* (2013.01)

(58) Field of Classification Search
CPC ........ B60L 15/08; B60L 3/0094; B60L 15/20; B60L 2220/16; B60L 2240/12; B60L 2240/421; B60L 2240/423; B60L 2240/427; B60L 2240/429; H02K 7/006; H02P 6/08
See application file for complete search history.

(56) References Cited

U.S. PATENT DOCUMENTS

2012/0239237 A1* 9/2012 Hashimoto ......... B60W 30/192
                                                        180/65.265

FOREIGN PATENT DOCUMENTS

| JP | H04-359691 A | 12/1992 | |
|---|---|---|---|
| WO | WO-2011155015 A1 * | 12/2011 | ............. B60K 6/365 |

* cited by examiner

*Primary Examiner* — Karen Masih
(74) *Attorney, Agent, or Firm* — Posz Law Group, PLC

(57) ABSTRACT

A motor drive device includes a vehicle speed sensor generating a pulse signal at a predetermined rotation angle of an output shaft in a power transmission system. The motor drive device is configured to perform: an initial setting process; an acquisition process; a detection process; a sine wave control process; and an abnormality determination process.

7 Claims, 7 Drawing Sheets

MOTOR DRIVE DEVICE

CROSS REFERENCE TO RELATED APPLICATION

The present application is based on and claims the benefit of priority of Japanese Patent Application No. 2019-209776, filed on Nov. 20, 2019, the disclosure of which is incorporated herein by reference.

TECHNICAL FIELD

The present disclosure generally relates to a motor drive device for driving a brushless motor that is a power source of a vehicle.

BACKGROUND INFORMATION

In order to drive the brushless motor, it is necessary to change a drive voltage according to a rotation angle of the motor. Therefore, this type of motor drive device is provided with an angle detection unit that detects a rotation angle of the motor.

Further, a magnetic pole sensor that detects a magnetic flux from a permanent magnet provided on a rotor of the motor can be used as an angle detection unit. However, when the magnetic pole sensor is used, the brushless motor becomes large and wiring from the magnetic pole sensor to the drive device is required.

SUMMARY

It is an object of the present disclosure to provide a sensorless type motor drive device that is capable of driving a brushless motor that is a power source of a vehicle by enabling an estimation of motor rotation angle in all rotation speed regions without increasing production costs.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described in the following with reference to the drawings.

First Embodiment

[Configuration]

Figure 1:
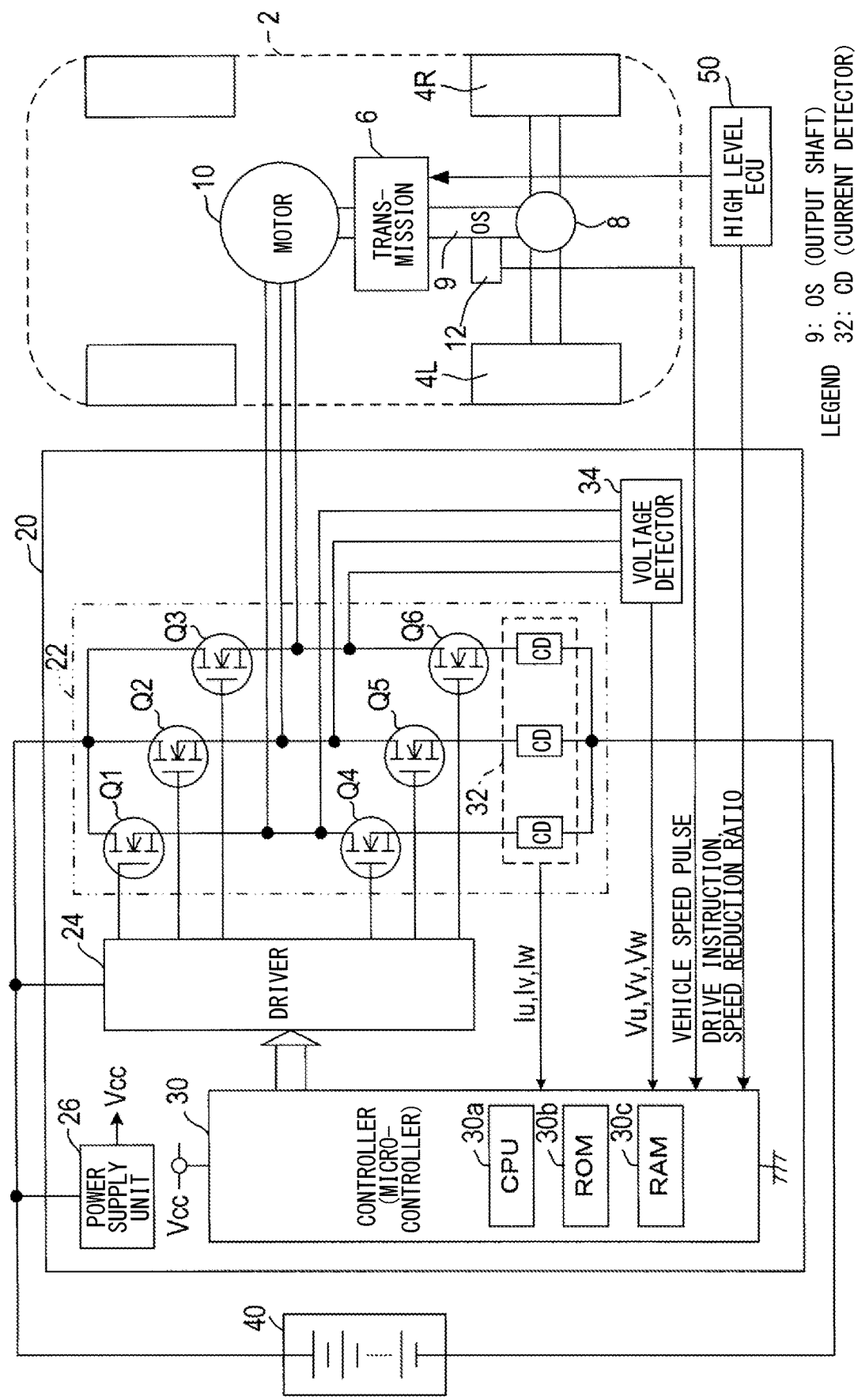
FIG. 1 is a block diagram of an overall configuration of a motor drive device according to a first embodiment.

As shown in FIG. 1, a motor drive device 20 of the present embodiment is mounted on a vehicle 2 such as an automobile, and drives a motor 10 that is a thrusting power source of the vehicle 2.

The motor 10 is composed of a three-phase brushless motor, and rotates left and right drive wheels 4L and 4R via a power transmission system of the vehicle 2. That is, in the power transmission system of the vehicle 2, a transmission 6 that decelerates the rotation of the motor 10 and transmits the rotation to an output shaft 9, and a differential gear 8 that transmits the rotation of the output shaft 9 to the left and right drive wheels 4L, 4R, are provided.

Therefore, the rotation of the motor 10 is transmitted to the left and right drive wheels 4L, 4R via the transmission 6, the output shaft 9, and the differential gear 8, and the respective drive wheels 4L, 4R rotate. On the differential gear 8 side of the output shaft 9, a vehicle speed sensor 12 for detecting a vehicle speed which is an average rotation speed of the left and right drive wheels 4L, 4R is provided. The vehicle speed sensor 12 is configured to generate a pulse signal as a vehicle speed detection signal (hereinafter, vehicle speed pulse) every time the output shaft 9 rotates by a predetermined angle, for example, 1 degree, in response to the rotation of the output shaft 9.

Next, the motor drive device 20 includes an inverter circuit 22, a driver 24, and a controller 30. The inverter circuit 22 receives power supply from a battery 40, and applies a battery voltage between terminals of each phase U, V, W of the motor 10, that is, between UV, VW, and WU. By doing so, a stator coil is energized to rotate the motor 10.

That is, the stator coils of each phase U, V, W of the motor 10 are Y-connected, and the inverter circuit 22 is connected to the three terminals on the opposite side of the connection. The inverter circuit 22 is composed of a three-phase full bridge circuit including six switching elements Q1 to Q6.

In the inverter circuit 22, the three switching elements Q1 to Q3 are provided as so-called high-side switches between the positive electrode of the battery 40 and the terminals of the phases U, V, W of the motor 10. The other three switching elements Q4 to Q6 are provided as so-called low-side switches between the negative electrode of the battery 40 and the terminals of the phases U, V, W of the motor 10.

Therefore, in the inverter circuit 22, by turning on one of the high-side switches and one of the low-side switches having different phases, the battery voltage can be applied between any terminals of the motor 10.

Then, by switching the switching element to be turned ON, the terminal to which the battery voltage is applied and the application direction of the battery voltage can be switched, and the electric current can be controlled by PWM (i.e., Pulse Width Modulation) controlling the ON time of one of the switching elements.

As shown in FIG. 1, the switching elements Q1 to Q6 are MOSFETs in the present embodiment, but may be other semiconductor elements such as bipolar transistors. Next, the driver 24 turns ON/OFF the switching elements Q1 to Q6 in the inverter circuit 22 in accordance with a control signal output from the controller 30, for flowing the electric current to the stator coil of each of three phases U, V, W of the motor 10, and for rotating the motor 10.

The controller 30 is composed of a microcomputer including a CPU 30a, a ROM 30b and a RAM 30c. Further, when the controller 30 receives a drive instruction from a high level electronic control unit (hereinafter, a high level ECU) 50 for travel control of the vehicle 2, the CPU 30a performs drive control of the motor 10 by executing a program stored in a non-transitory, tangible recording medium such as the ROM 30b.

That is, when a drive instruction for driving the motor 10 is input from the high level ECU 50, the controller 30 performs PWM control of the electric current flowing in the stator coils of each of three phases U, V, W, by outputting a control signal to the driver 24 so that the rotation speed of the motor 10 becomes a rotation speed corresponding to the drive instruction.

As a result, the motor 10 rotates at a rotation speed corresponding to the drive instruction from the high level ECU 50, and rotates the drive wheels 4L, 4R via the transmission 6, the output shaft 9 and the differential gear 8 that form the power transmission system of the vehicle 2.

Therefore, the vehicle speed of the vehicle 2 changes according to the rotation speed of the motor 10, and the high level ECU 50 can control the vehicle speed by the drive instruction output to the controller 30 of the motor drive device 20.

Note that the high level ECU 50 is for integrally controlling the motor 10 and the transmission 6 in accordance with an amount of depression of an accelerator pedal by the driver. Note also that a speed reduction ratio γ of the machine 6 is also input from the high level ECU 50 to the controller 30.

Further, the motor drive device 20 includes a voltage detector 34 for detecting the voltages Vu, Vv, Vw at the terminals of the phases U, V, W of the motor 10, and a current detector 32 for detecting electric currents Iu, Iv, and Iw, respectively flowing in the stator coils of the phases U, V, W.

Detection signals from the detectors 34 and 32 are input to the controller 30 and used to drive the motor 10 and detect an abnormality. The motor drive device 20 is also provided with a power supply unit 26 that generates a predetermined direct current (DC) constant voltage as a power supply voltage Vcc for operating the internal circuits such as the controller 30.

[Outline of Motor Control]

In the mean time, the controller 30, in order to rotate the motor 10, selects a terminal to which the battery voltage is applied from among the terminals of phase U, V, W in synchronization with the rotation of the motor 10, and switches a switching element in the inverter circuit 22 to be turned ON.

Therefore, the motor 10 is generally provided with a magnetic pole sensor that detects a magnetic flux from a permanent magnet provided on a rotor so that a rotation angle can be detected. However, the motor drive device 20 of the present embodiment is a sensorless system that can drive the motor 10 by detecting the rotation angle of the motor 10 without using a magnetic pole sensor in order to downsize the motor 10.

More specifically, in the present embodiment, the controller 30 divides a rotation region of the motor 10 into a high speed rotation region and a low speed rotation region, drives the motor 10 in a rectangular wave in the high speed rotation region, and drives the motor 10 in a sine wave in the low speed rotation region.

Figure 2:
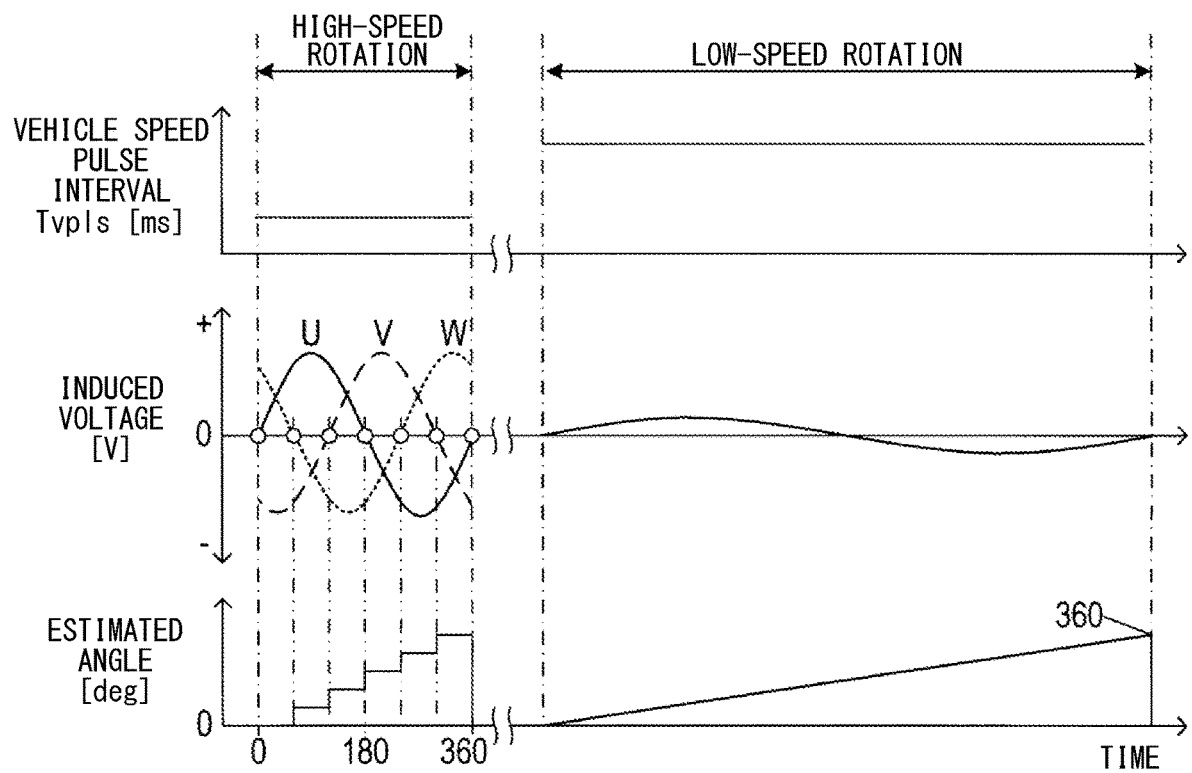
FIG. 2 is an explanatory diagram of a relationship between an induced voltage generated during high speed rotation and low speed rotation of a motor, a vehicle speed pulse interval, and an estimated angle.

That is, in the high speed rotation region of the motor 10, the controller 30 estimates the rotation angle of the motor 10, based on an induced voltage generated in the stator coil that is temporarily de-energized by the driving of the motor 10 in a rectangular wave, as shown in FIG. 2.

Further, in the high speed rotation region of the motor 10, since the motor 10 is driven by the rectangular wave, it is necessary to switch an energization pattern by the inverter circuit 22 every time the motor 10 rotates by an electrical angle of 60 degrees. Therefore, the rotation angle is estimated every 60 degrees of the rotation angle of the motor 10.

Note that the rectangular wave drive of the motor 10 and the estimation of the rotation angle using the induced voltage are well-known techniques, and thus detailed description thereof is omitted here. On the other hand, in the low speed rotation region of the motor 10, the rotation angle of the motor 10 is estimated based on (i) a vehicle speed pulse output from the vehicle speed sensor 12 as a vehicle speed detection signal and (ii) the speed reduction ratio γ of the transmission 6 acquired from the high level ECU 50.

This is because in the low speed rotation region of the motor 10, as shown in FIG. 2, the induced voltage generated in the stator coil that is in the de-energized state due to the rectangular wave drive of the motor 10 is small, and the rotation angle of the motor 10 cannot be suitably estimated.

Estimation of the rotation angle of the motor 10 from the vehicle speed pulse and the speed reduction ratio γ is also beneficial in terms of enabling estimation of the rotation angle even in the low speed region in consideration of power transmission characteristics in the power transmission system that transmits rotation from the motor 10 via the transmission 6 and the output shaft 9 to the vehicle speed sensor 12

Figure 3:
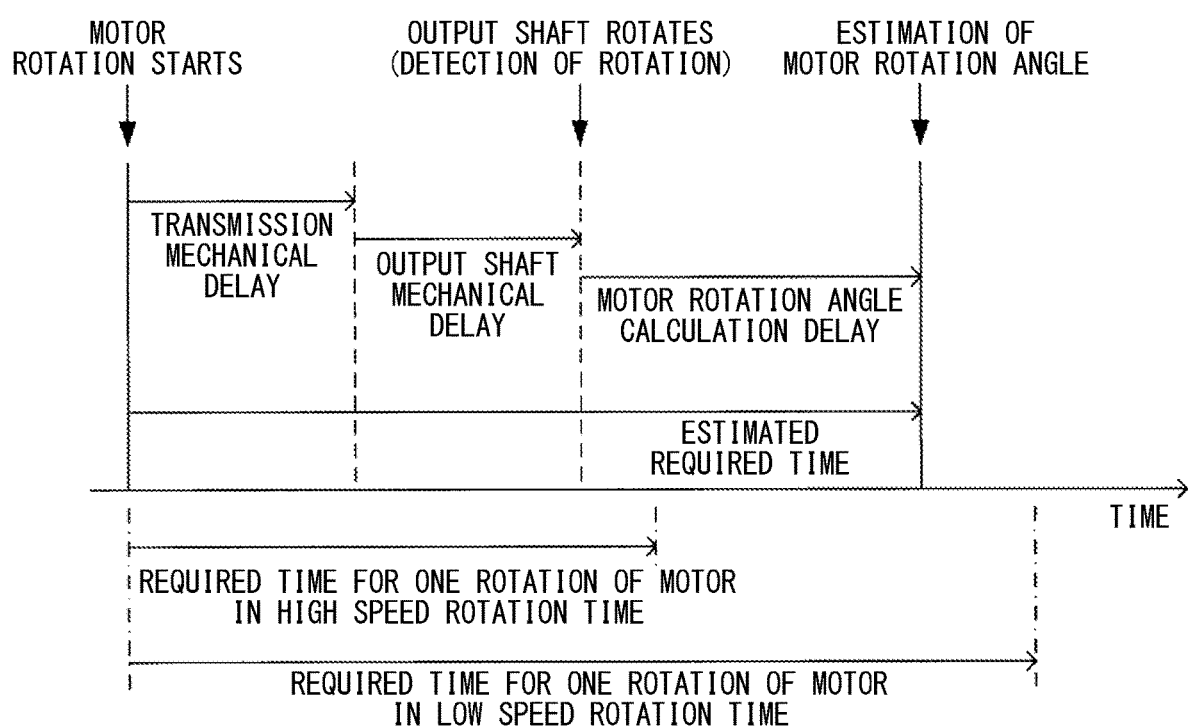
FIG. 3 is a time chart of a delay time from a start of rotation of the motor until a rotation angle is estimated.

That is, in the power transmission system from the motor 10 to the vehicle speed sensor 12, power transmission delay (i.e., mechanical delay) occurs in the transmission 6 and the output shaft 9 as shown in FIG. 3. Therefore, in the low speed rotation region of the motor 10, the rotation angle θnow of the motor 10 is estimated using the following equation (1) including the angle conversion coefficient Kd set according to the transmission delay, and, based on the estimated rotation angle θnow, the motor 10 is driven by a sine wave.

$$\theta now = \theta pre + (Kg + Kd) \times Tvpls \quad (1)$$

However, in the equation (1), θpre is a previously estimated value of the rotation angle, Kg is an angle conversion coefficient set according to the speed reduction ratio γ of the transmission 6, and Tvpls is a vehicle speed pulse generation interval (hereinafter, vehicle speed pulse interval) calculated from the vehicle speed sensor 12.

The drive of the motor 10 is started in a set state in which the rotation angle of the motor is initialized to a reference angle of zero degree, for example, by energizing the motor 10, and the estimation of the rotation angle in the low speed region (just) after the start of driving the motor 10 is performed periodically at a predetermined time interval (for example, 100μs).

This is because, when the motor 10 is driven by a sine wave, it is necessary to switch the switching element in the inverter circuit 22 at a higher speed than in the rectangular wave drive to control the drive voltage in a sine wave shape.

It should be noted that, as shown in FIG. 3, a predetermined calculation time is required from (i) when the rotation of the output shaft 9 is recognized by the vehicle speed sensor 12 to (ii) when the rotation angle of the motor 10 is estimated by the above calculation, which means that there is a calculation delay therebetween. On the other hand, a rotation time required for the motor 10 to rotate once (i.e., 360 degrees) becomes shorter as the rotation speed of the motor 10 increases, for example.

Therefore, when the motor 10 rotates at a high speed, the required rotation time of the motor 10 becomes shorter than the required estimation time of the rotation angle including the mechanical delay of the transmission 6 and the output shaft and the calculation delay, which may make the estimation inaccurate/impossible.

However, in the present embodiment, the rotation angle of the motor 10 is estimatable by the above calculation when the motor 10 is rotating at low speed, i.e., a situation in which the required rotation time of the motor 10 is longer than the required estimation time of the rotation angle, thereby enabling a proper/appropriate estimation of the rotation angle of the motor 10.

[Processes]

Next, a control process performed by the controller 30 to drive and control the motor 10 as described above is described.

Figure 4:
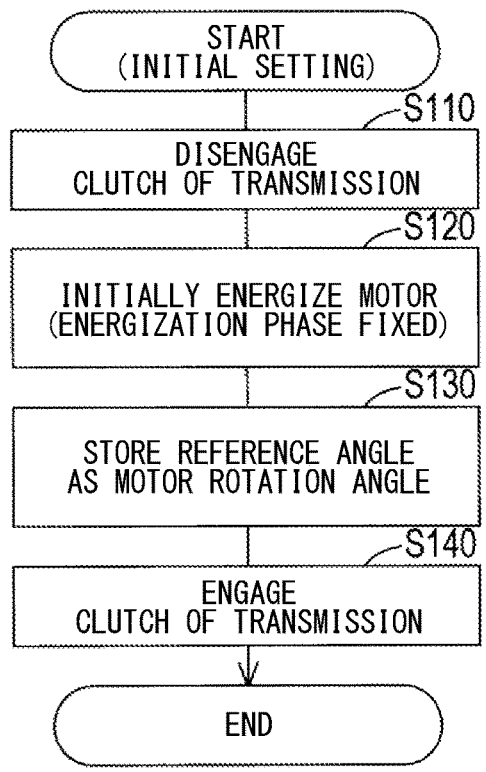
FIG. 4 is a flowchart of a process of initializing a rotation angle of the motor.

FIG. 4 shows an initial setting process performed immediately after the power supply unit 26 generates the power supply voltage Vcc and the controller 30 is activated, which are triggered by turning on of the motor drive device 20. The initial setting process is a process for initializing the rotation angle to the reference angle before starting the drive of the motor 10, and corresponds to a rotation angle setting unit of the present disclosure.

As shown in FIG. 4, in the initial setting process, first, in S110, a clutch provided in the transmission 6 is disengaged, so that the connection of the power transmission system from the transmission 6 to the output shaft 9 is disengaged, and the process proceeds to S120.

In S120, the stator coil of a specific phase preset for initial driving of the motor 10 is energized via the inverter circuit 22 to set the rotational position of the motor 10 at a predetermined reference angle.

Then, in subsequent S130, the reference angle set in S120 is stored in a memory such as the RAM 30c as a current rotation angle of the motor 10, and in subsequent S140, the clutch provided in the transmission 6 is engaged, and then the initialization process ends.

Therefore, after the energization of the motor drive device 20, the rotation angle of the motor 10 is initially set to the reference angle. Next, when the rotation angle of the motor 10 is set to the reference angle by the above-described initialization process, the controller 30 waits for a drive instruction from the high level ECU 50, and, when the drive instruction is input, the controller 30 starts a drive control process of the motor 10 shown in FIG. 5.

In the drive control process, a vehicle speed pulse interval Tvpls is acquired in S210, and a rotation speed Vm of the motor 10 is estimated from the acquired vehicle speed pulse interval Tvpls in S220. The vehicle speed pulse interval Tvpls is a time interval measured using a counter or the like each time a vehicle speed pulse is input from the vehicle speed sensor 12, and, in S210, the measured vehicle speed pulse interval Tvpls is acquired.

When the vehicle speed pulse interval Tvpls cannot be acquired in S210, it can be determined that the vehicle 2 is stopped, thus, in S220, the rotation speed Vm of the motor 10 is estimated to be "0."

When the vehicle speed pulse interval Tvpls can be acquired in S210, the speed reduction ratio γ of the transmission 6 is acquired from the high level ECU 50 in S220, and the rotation speed Vm of the motor 10 is estimated based on the speed reduction ratio γ and the vehicle speed pulse interval Tvpls.

When the rotation speed Vm of the motor 10 is estimated in S220 as described above, the process proceeds to S230, and it is determined whether the rotation speed Vm of the motor 10 is equal to or higher than a preset threshold value Vth for speed determination. The process of S230 corresponds to a speed determination unit of the present disclosure.

When the rotation speed Vm of the motor 10 is equal to or higher than the threshold value Vth, i.e., when it is determined in S230 that the motor 10 is rotating at a high speed, the process proceeds to S240 and a rectangular wave control process for driving the motor 10 in a rectangular wave is performed.

Alternatively, when the rotation speed Vm of the motor 10 is less than the threshold value Vth, i.e., when it is determined in S230 that the motor 10 is rotating at a low speed, the process proceeds to S250, and a sine wave control process for driving the motor 10 in a sine wave is performed.

In the rectangular wave control process, in order to estimate the rotation angle of the motor 10 from the induced voltage, the rotation speed of the motor 10 needs to be approximately 10% or more of the maximum rotation speed, which means, for example, 2000 rpm is set as Vth.

By setting the threshold value Vth in such manner, the two types of control described above can be switched at a vehicle speed of about 30 km/h when the speed reduction ratio of the transmission 6 is 2.45 and the speed reduction ratio of the differential gear 8 is 3.42, for example. Note that these numerical values are examples only, and may be set appropriately according to a vehicle to be controlled.

Figure 6:
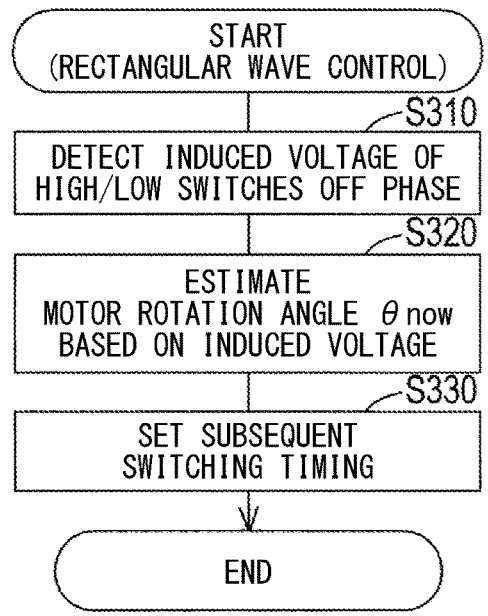
FIG. 6 is a flowchart of a rectangular wave control process when the motor rotates at high speed.

Next, the rectangular wave control process performed in S240 and the sine wave control process performed in S250 are described with reference to flowcharts shown in FIGS. 6 and 7. As shown in FIG. 6, in the rectangular wave control process, first in S310, the induced voltage generated in the stator coil of a phase in the de-energized state due to the rectangular wave drive of the motor 10 is detected via the voltage detector 34.

In the motor 10, the stator coils of each phase are in the de-energized state when both of the high-side switch and the low-side switch connected to the terminals are in an OFF state. Therefore, in S310, the induced voltage generated in the stator coil of a phase in which both of high-side and low-side switches connected to the terminals are in an OFF state is detected.

Then, in subsequent S320, the rotation angle θnow of the motor 10 is estimated based on the induced voltage detected in S310. Then, in subsequent S330, a switching timing at which the energized phase of the rectangular wave drive is subsequently switched via the inverter circuit 22 is set, and the process ends once.

Note that, when the motor 10 is driven in a rectangular wave, the switching timing for switching the energized phase occurs every time the motor 10 rotates by 60 degree electric angles. That is, the rectangular wave control process shown in FIG. 6 is repeated every 60 degree electric angles.

Figure 5:
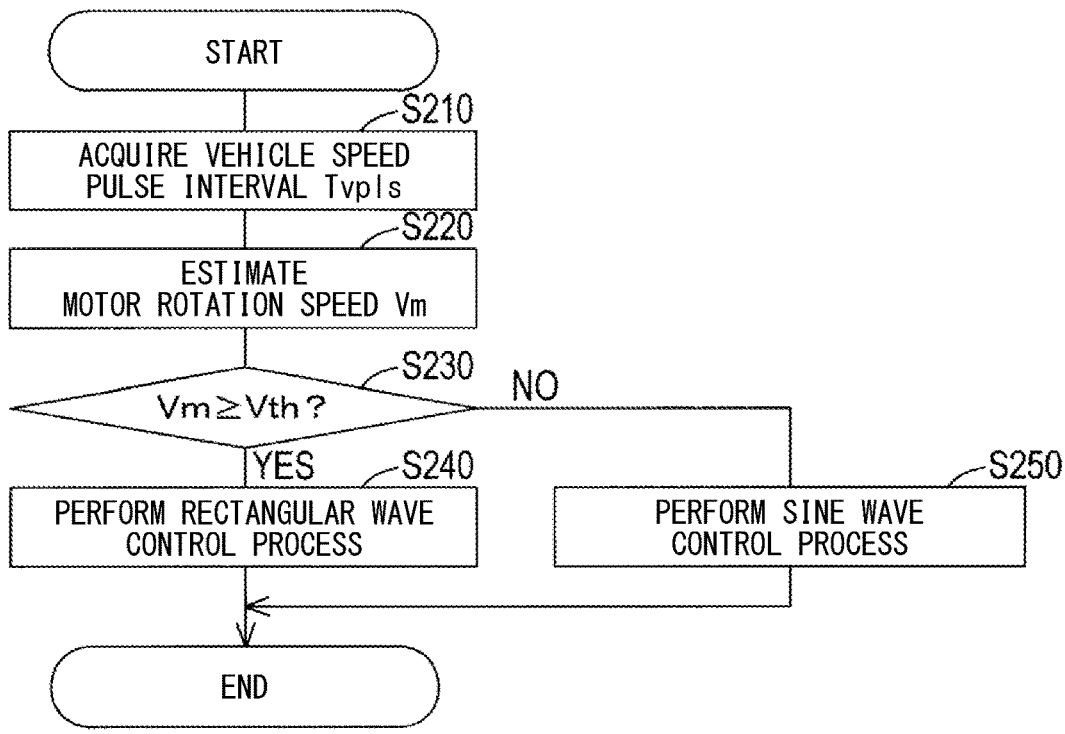
FIG. 5 is a flowchart of a control process for driving and controlling the motor.

Then, when the rotation angle of the motor 10 reaches 360 degrees, the rectangular wave control process ends once, the process returns to S210 of FIG. 5, and the processes of S210 and thereafter are performed again. Next, in the sine wave control process, as shown in FIG. 7, first, in S410, a previously estimated value θpre of the rotation angle of the motor 10 is acquired, and then in S420, the vehicle speed pulse interval Tvpls and the speed reduction ratio γ of the transmission 6 are acquired.

Note that, at a timing immediately after the start of driving of the motor 10, the reference angle stored as the rotation angle in the initial setting process of FIG. 4 is set as the previously estimated value θpre. Further, when the motor control is switched from the rectangular wave control process to the sine wave control process, the previously estimated value θpre is set to 360 degrees estimated in the rectangular wave control process before control switching, i.e., is set to 0 degree.

Next, in S430, based on the previously estimated value θpre of the rotation angle of the motor 10, the vehicle speed pulse interval Tvpls, and the speed reduction ratio γ of the transmission 6, which are acquired in S410 and S420, the current rotation angle θ of the motor 10 is estimated by using the equation (1) mentioned above.

Then, in subsequent S440, the rotation angle θnow estimated this time (in S430) is stored in a memory such as the RAM 30c as the previously estimated value θpre, and in subsequent S450, a switching timing of the sine wave drive of the motor 10 is set based on the rotation angle θnow estimated this time (in S430).

Figure 7:
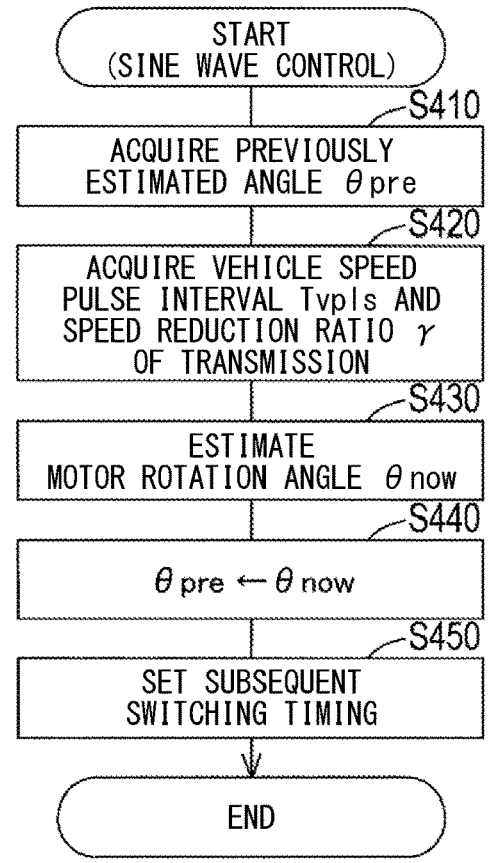
FIG. 7 is a flowchart of a sine wave control process when the motor rotates at low speed.

Note that the sine wave control process shown in FIG. 7 is periodically performed at predetermined time intervals so that the motor 10 can be driven by a sine wave, but, just like the rectangular wave control process, when the estimated rotation angle of the motor 10 reaches 360 degrees, the process ends once, and the process returns to S210 of FIG. 5.

This is because, by switching from the sine wave control to the rectangular wave control and from the rectangular wave control to the sine wave control when the rotation angle of the motor 10 becomes 360 degrees (i.e., 0 degrees), the estimation result of the rotation angle is prevented from suffering from an error.

[Effects]

As described above, in the motor drive device 20 of the present embodiment, when the motor 10 rotates at a low speed, the motor 10 is driven by a sine wave, and when the motor 10 rotates at a high speed, the motor 10 is driven by a rectangular wave.

Then, during the rectangular wave drive, an induced voltage generated in the stator coil due to the rotation of the motor 10 is detected, the rotation angle of the motor 10 is estimated from the detected induced voltage, and the switching timing of the inverter circuit 22 for driving the motor 10 with a rectangular wave is set.

Further, at the time of sine wave drive, the rotation angle of the motor 10 is estimated by using the above-described equation (1) based on the vehicle speed pulse interval Tvpls and the speed reduction ratio γ of the transmission 6, and the switching timing of the inverter circuit 22 for driving the motor 10 by a sine wave is set.

Therefore, according to the motor drive device 20 of the present embodiment, the rotation angle of the motor 10 is estimated and the motor 10 is driven not only at a high speed rotation time of the motor 10 but also at a low speed rotation time of the motor 10, without performing a complicated calculation.

Therefore, in the motor drive device 20 of the present embodiment, it is not necessary to configure the controller 30 with an arithmetic circuit capable of performing high speed operation, thereby realizing the motor drive device 20 at low cost.

Further, according to the motor drive device 20 of the present embodiment, when the motor 10 rotates at a low speed, the motor 10 is driven by a sine wave, which enables a stable low speed drive of the motor 10 without suffering from fluctuation of rotation and from noise during the low speed rotation time.

Second Embodiment

Figure 8:
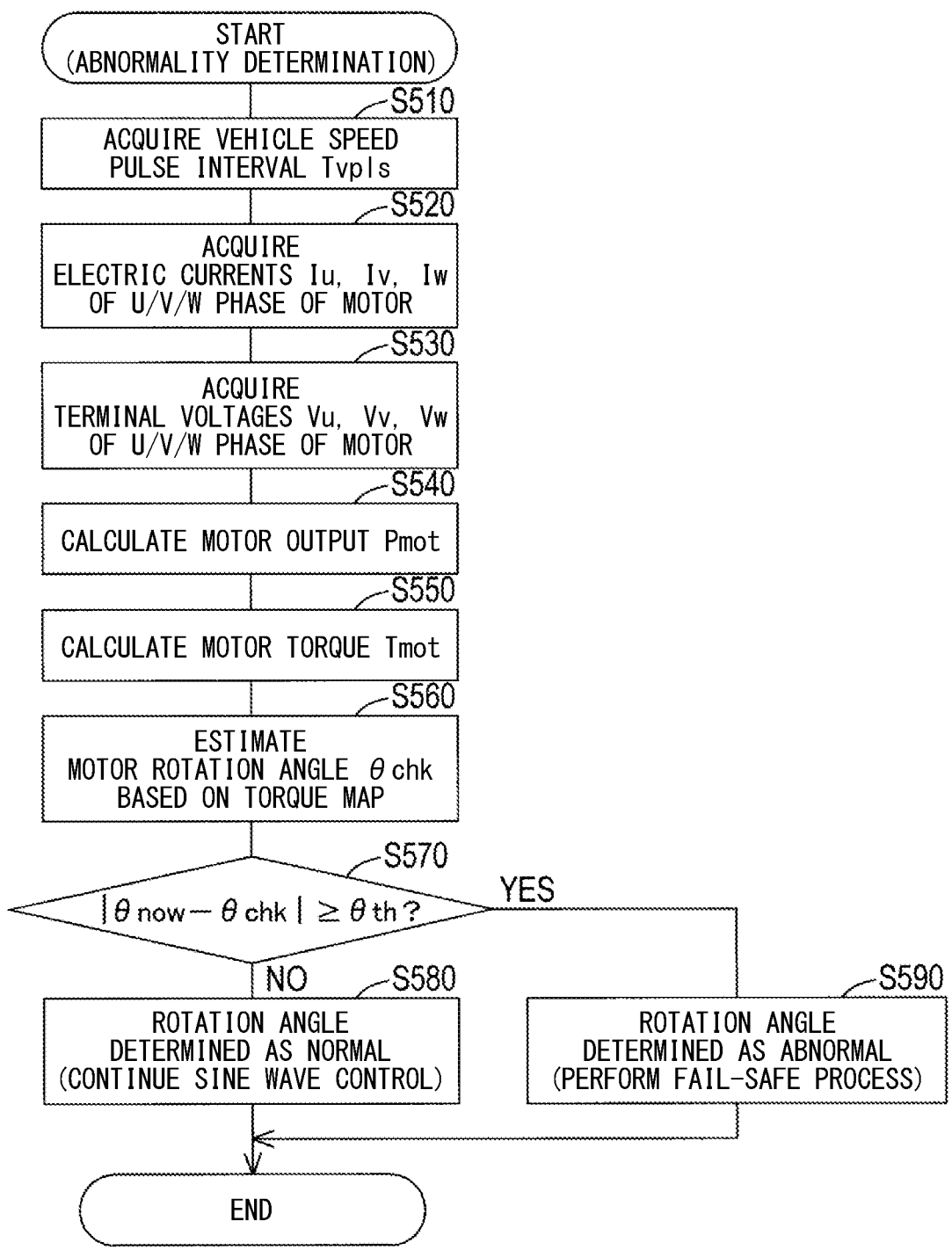
FIG. 8 is a flowchart of a determination process for performing abnormality determination of an estimation result of the rotation angle in the motor drive device of the second embodiment.

The motor drive device according to the present embodiment is configured similarly to the motor drive device 20 according to the first embodiment, and is different from the motor drive device 20 according to the first embodiment in the sine wave control performed in S250 of FIG. 5, in which an abnormality determination process shown in FIG. 8 is performed together with the sine wave control process shown in FIG. 7.

Therefore, in the present embodiment, the abnormality determination process shown in FIG. 8 is described. In the abnormality determination process, it is determined whether the rotation angle θnow of the motor 10 estimated by the sine wave control process shown in FIG. 7 is normal or not, and, when abnormality of the rotation angle θnow is determined, a fail-safe process for retreat travel of the vehicle 2 is performed.

Therefore, the abnormality determination process is repeatedly performed in the CPU 30a of the controller 30 in parallel with the sine wave control process shown in FIG. 7, for example, in synchronization with the generation timing of the vehicle speed pulse.

As shown in FIG. 8, in the abnormality determination process, first in S510, the vehicle speed pulse interval Tvpls is acquired. Then, in subsequent S520, detection values of electric currents Iu, Iv, and Iw flowing in the stator coils of the phases U, V, and W of the motor 10 are acquired from the current detector 32.

In subsequent S530, detected values of terminal voltages Vu, Vv, Vw of the respective phases U, V, W of the motor 10 are acquired from the voltage detector 34. Next, in S540, a motor output Pmot is calculated based on the detected values of the electric currents Iu, Iv, Iw and the terminal voltages Vu, Vv, Vw acquired in S520 and S530.

The motor output Pmot is calculated by calculating an instantaneous active power component of "Iu×Vu+Iv×Iv+Iw×Vw". In subsequent S550, a motor torque Tmot is calculated based on the motor output Pmot calculated in S540, the rotation speed Vm of the motor 10 calculated from the vehicle speed pulse interval Tvpls acquired in S510, and a preset transmission loss coefficient Kloss.

The following equation (2) is used to calculate the motor torque Tmot, for example.

$$Tmot = Pmot \times Vm \times Kloss \qquad (2)$$

Figure 9:
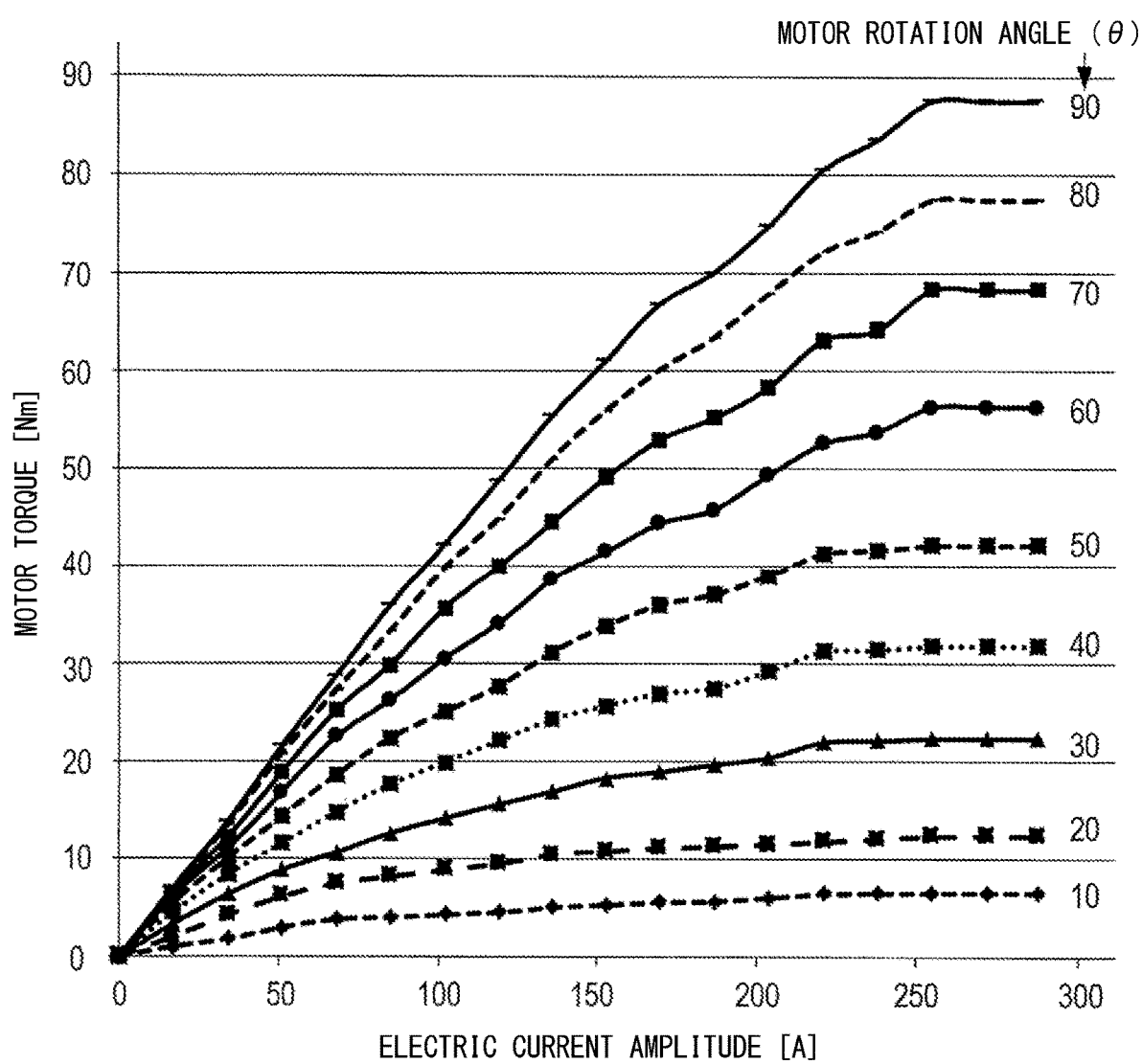
FIG. 9 is an explanatory diagram of a torque map used to estimate a motor angle θchk in the determination process of FIG. 8.

Then, in S560, a rotation angle θchk of the motor 10 is estimated using a torque map shown in FIG. 9 based on the motor torque Tmot calculated in S550.

The torque map shown in FIG. 9 is configured to estimate the rotation angle θchk of the motor 10 from a motor torque and a current amplitude in an orthogonal αβ axis fixed coordinate system. Therefore, in S560, the three-phase currents Iu, Iv, and Iw detected in S520 are combined and αβ converted to acquire the current amplitude, and the rotation angle θchk is estimated based on the current amplitude and the motor torque.

Next, in S570, it is determined whether an absolute value of difference between the rotation angle θnow estimated in the sine wave control process of FIG. 7 and the rotation angle θchk estimated in S560 is equal to or greater than a preset abnormality determination value θth.

When it is determined in S570 that the absolute value of difference between the rotation angles θnow and θchk is not equal to or greater than the abnormality determination value θth, the process proceeds to S580, and the rotation angle θnow estimated by the sine wave control process is determined to be normal, and the sine wave control process of FIG. 7 is continued.

Also, when it is determined in S570 that the absolute value of a difference between the rotation angles θnow and θchk is equal to or greater than the abnormality determination value θth, the process proceeds to S590, and either the rotation angle θnow or the abnormality determination value θth is determined as abnormal.

Then, in S590, the sine wave control process of FIG. 7 is prohibited and a fail-safe process for retreat travel of the vehicle 2 is performed, since continuing the drive of the motor 10 in such state may lead to an improper drive of the motor.

In the fail-safe process, for example, the driver of the vehicle 2 is notified of an abnormality in the motor drive system, and a gear of the transmission 6 is set to the low gear under control of the high level ECU 50 so that the speed reduction ratio γ of the transmission 6 is increased, and then, the motor 10 is driven by a rectangular wave. Further, when the motor 10 is driven by a rectangular shape, the motor 10 is driven by the rectangular wave control process shown in FIG. 6 so that the rotation speed Vm of the motor 10 becomes equal to or higher than the threshold value Vth.

As a result, the driver can drive the vehicle 2 at a low speed to drive the vehicle 2 to a desired retreat position. As described above, in the motor drive device of the present embodiment, whether the rotation angle θnow of the motor 10 estimated when the motor 10 is driven by a sine wave is normal, or, in other words, whether it is reliable or not, is determined, and, if it is determined as not reliable, the sine wave drive is stopped.

Therefore, it is possible to suppress/prevent the sine wave drive of the motor 10 by the erroneously detected rotation angle θnow, and it is possible to improve the reliability of the motor drive device. Further, when the sine wave drive of the motor 10 is stopped, the motor 10 is driven by a rectangular wave to perform the fail-safe process for driving the vehicle 2 at a low speed. Therefore, the driver can perform the retreat travel of the vehicle 2 owing to the fail-safe process.

Therefore, according to the motor drive device of the present embodiment, it is possible to enhance travel time safety of the vehicle. In the present embodiment, the process of S410 to S430 that estimates the rotation angle θnow in the sine wave control process of FIG. 7 corresponds to a first estimation unit of the present disclosure. Further, the process of S510 to S560 for estimating the rotation angle θchk in the abnormality determination process of FIG. 8 corresponds to a second estimation unit of the present disclosure, and the process of S570 to S590 for performing the abnormality determination of the rotation angle θnow, and for performing the fail-safe process at the time of abnormality corresponds to an abnormality determination unit of the present disclosure.

Other Embodiments

Although the embodiments of the present disclosure have been described above, the present disclosure is not limited to the embodiments described above, and various modifications can be made to implement the present disclosure.

For example, in the above embodiments, the rotation angle θnow of the motor 10 used when the motor 10 is driven by a sine wave is described as being estimated by using the equation (1) based on the vehicle speed pulse interval Tvpls and the speed reduction ratio γ of the transmission 6 in S410 to S430 of FIG. 7.

However, the rotation angle θnow of the motor 10 used when the motor 10 is driven by a sine wave does not necessarily have to be estimated by the same procedure as in the above embodiment, and may be estimated by other methods as long as the rotation angle θnow is estimatable based on the vehicle speed pulse interval Tvpls.

That is, the rotation angle θnow may be estimated by using, for example, (i) the motor torque Tmot calculated from the vehicle speed pulse interval Tvpls, the currents Iu, Iv, Iw, and the terminal voltages Vu, Vv, Vw in the same procedure as S510 to S560 in FIG. 8, and (ii) the torque map illustrated in FIG. 9.

Further, in the above embodiments, the vehicle 2 is described as an electric vehicle in which the drive wheels 4L and 4R are rotationally driven only by the motor 10. However, the technique of the present disclosure is applicable to a hybrid vehicle in which the drive wheels 4L and 4R are configured to be rotationally driven by an engine and the motor.

Further, in the above-described embodiments, it is described that the controller 30 is implemented by a microcomputer/microcontroller, and the CPU 30a executes a program stored in the non-transitory, tangible recording medium such as the ROM 30b to perform the motor control shown in FIGS. 4 to 8.

However, the controller 30 may be implemented/realized partially or as a whole of the above-mentioned functions by one or more dedicated hardware logic circuits. In addition, multiple functions of one component in the above embodiment may be realized by multiple components, or a function of one component may be realized by multiple components. In addition, multiple functions of multiple components may be realized by one component, or a single function realized by multiple components may be realized by one component. In addition, a part of the configuration of the above embodiment may be omitted. In addition, at least a part of the configuration of the above embodiment may be added to or substituted from the configuration of the other of the above embodiments.

The motor drive device of the above embodiments of the present disclosure may also be realized as a vehicle control system including the motor drive device as a component, as a program for causing a computer to function as the motor drive device, as a non-transitory, substantive recording medium such as a semiconductor memory recording such program, or a motor drive control method, i.e., may be implemented/realized in various forms.

What is claimed is:
1. A motor drive device for driving a brushless motor serving as a thrusting power source of a vehicle, comprising:
a vehicle speed sensor provided on an output shaft of a power transmission system for transmitting rotation of the brushless motor directly or indirectly to drive wheels, and configured to generate a pulse signal at a predetermined rotation angle of the output shaft;

a controller configured to
- determine whether the brushless motor is rotating at a high speed or at a low speed based, at least partly, on a generation interval of the pulse signal from the vehicle speed sensor;
- (i) estimate, based on an induced voltage generated in a stator coil of the brushless motor, a rotation angle required to perform a rectangular wave drive of the brushless motor, and (ii) perform the rectangular wave drive of the brushless motor according to the estimated rotation angle when the controller determines that the brushless motor is rotating at a high speed; and
- (i) estimate, based on a generation interval of the pulse signal from the vehicle speed sensor, the rotation angle required to perform a sine wave drive of the brushless motor, and (ii) perform the sine wave drive of the brushless motor according to the estimated rotation angle when the controller determines that the brushless motor is rotating at a low speed.

2. The motor drive device according to claim 1, wherein the controller is configured to estimate the rotation angle of the brushless motor based on (i) the generation interval of the pulse signal, and (ii) a power transmission characteristic of the power transmission system from the brushless motor to the vehicle speed sensor.

3. The motor drive device according to claim 1, wherein the controller is configured to:
(A) calculate a torque of the brushless motor based on
  (i) the generation interval of the pulse signal,
  (ii) an electric current flowing in the stator coil of each phase of the brushless motor, and
  (iii) a terminal voltage of each phase of the brushless motor; and
(B) estimate the rotation angle of the brushless motor based on the calculated torque.

4. The motor drive device according to claim 1, wherein the controller is further configured to:
calculate a first estimated rotation angle of the brushless motor based on: (i) the generation interval of the pulse signal and (ii) the power transmission characteristic of the power transmission system from the brushless motor to the vehicle speed sensor;
(A) calculate the torque of the brushless motor, based on
  (i) the generation interval of the pulse signal,
  (ii) an electric current flowing in the stator coil of each phase of the brushless motor, and
  (iii) a terminal voltage of each phase of the brushless motor, and
(B) calculate a second estimated rotation angle of the brushless motor based on the calculated torque;
(C) determine whether an absolute value of a difference between the first estimated rotation angle and the second estimated rotation angle is equal to or greater than a preset abnormality determination value, and
either to (D) perform the sine wave drive of the brushless motor according to the rotation angle estimated by the controller when the absolute value of the difference between the first estimated rotation angle and the second estimated rotation angle is not equal to or greater than the preset abnormality determination value or (E) perform the rectangular wave drive of the brushless motor for enabling a retreat travel of the vehicle by determining that abnormality has occurred in estimation of the rotation angle when the absolute value of the difference between the first estimated rotation angle and the second estimated rotation angle is equal to or greater than the abnormality determination value.

5. The motor drive device according to claim 1 wherein: the controller is further configured to set the rotation angle of the brushless motor to a reference angle before starting driving of the brushless motor by:
(i) temporarily disengaging the output shaft from the brushless motor in the power transmission system, and
(ii) energizing a specific phase of the stator coil in the brushless motor.

6. A speed determiner comprising:
a processor; and
a non-transitory computer-readable storage medium including instructions that, when executed, perform steps including:
(A) perform an initial setting process including:
  (i) disengage a clutch of a transmission,
  (ii) initially energize a motor,
  (iii) store a reference angle as a motor rotation angle, and
  (iv) engage the clutch of the transmission;
(B) perform an acquisition process including:
  (i) acquire a vehicle speed pulse interval,
  (ii) estimate a motor rotation speed (Vm),
  (iii) determine whether the motor rotation speed (Vm) is greater than or equal to a threshold motor rotation speed (Vth),
  (iv) upon a determination that Vm≥Vth, perform a rectangular wave control process, and
  (v) upon a determination that Vm<Vth, perform a sine wave control process;
(C) perform a detection process including:
  detect an induced voltage associated with switching,
  estimate a present motor rotation angle (θnow) based at least partly on the induced voltage, and
  set a subsequent switching timing; and
(D) perform a sine wave control process including:
  acquire a previously estimated angle,
  acquire a vehicle speed pulse interval and a speed reduction ratio of the transmission,
  estimate the present motor rotation angle (θnow) based at least partly on: the vehicle speed pulse interval, and the speed reduction ratio of the transmission,
  set the previously estimated angle to the present motor rotation angle (θnow), and
  set a subsequent switching timing.

7. The speed determiner of claim 6, wherein the instructions are further configured to perform additional steps including:
(E) perform an abnormality determination process including:
  acquire the vehicle speed pulse interval,
  acquire electrical currents of phases of the motor,
  acquire terminal voltages of phases of the motor,
  calculate a motor output,
  calculate a motor torque,
  estimate a motor check angle (θchk) based at least partially on a torque map,
  determine whether an inequality is true, based at least partly on an abnormality determination value (θth), wherein the inequality is:

(an absolute value of ((θnow)−(θchk)))≥(θth)

continue, upon a determination that the inequality is false, the sine wave control, and perform, upon a determination that the inequality is true, a fail-safe process.

* * * * *